United States Patent
Stählin (10) Patent No.: US 11,880,258 B2
(45) Date of Patent: Jan. 23, 2024

(54) PERFORMANCE OPTIMIZATION BASED ON HMI PRIORITIES

(71) Applicant: Continental Automotive Systems, Inc., Auburn Hills, MI (US)

(72) Inventor: Ulrich Stählin, Oakland Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 329 days.

(21) Appl. No.: 16/923,310

(22) Filed: Jul. 8, 2020

(65) Prior Publication Data

US 2021/0011539 A1   Jan. 14, 2021

Related U.S. Application Data

(60) Provisional application No. 62/873,076, filed on Jul. 11, 2019.

(51) Int. Cl.
| | |
|---|---|
| *G06F 1/3228* | (2019.01) |
| *G06F 9/54* | (2006.01) |
| *B60K 35/00* | (2006.01) |
| *G06F 1/329* | (2019.01) |
| *G06F 1/3296* | (2019.01) |

(52) U.S. Cl.
CPC ............ *G06F 1/3228* (2013.01); *B60K 35/00* (2013.01); *G06F 1/329* (2013.01); *G06F 1/3296* (2013.01); *G06F 9/542* (2013.01); *G06F 9/546* (2013.01)

(58) Field of Classification Search
CPC ...... B60K 2370/1529; B60K 2370/166; B60K 2370/40; B60K 35/00; G06F 1/3228; G06F 1/329; G06F 1/3296; G06F 2209/548; G06F 3/016; G06F 9/542; G06F 9/546; Y02D 10/00
See application file for complete search history.

(56) References Cited

U.S. PATENT DOCUMENTS

| | | | | |
|---|---|---|---|---|
| 5,095,532 | A * | 3/1992 | Mardus | G08G 1/096716 340/905 |
| 6,216,085 | B1 * | 4/2001 | Emmerink | G08G 1/093 701/414 |
| 9,381,813 | B2 * | 7/2016 | Hampiholi | B60R 16/023 |
| 11,093,767 | B1 * | 8/2021 | Argenti | B60W 40/06 |

(Continued)

*Primary Examiner* — Jaweed A Abbaszadeh
*Assistant Examiner* — Brian J Corcoran (57) ABSTRACT

A method for reducing processing power of a data processing hardware executing one or more applications is provided. The method includes receiving communication messages and identifying a first application outputting a first message based on at least one communication message. The first application is associated with a first priority value. The method includes determining a group of high-priority applications where each application has a priority value being higher than or equal to the first priority value and determining a group of low-priority applications where each application has a priority value being lower than the first priority value. The method includes discarding one or more communication messages that are not relied on by the group of high-priority applications for a predefined period of time. The method may also include sending, to the group of low-priority applications, instructions causing the one or more applications of the low-priority group to stop executing.

15 Claims, 2 Drawing Sheets

(56) References Cited

U.S. PATENT DOCUMENTS

| | | | |
|---|---|---|---|
| 2014/0366041 A1* | 12/2014 | Stanley-Marbell | G06F 9/542 |
| | | | 719/318 |
| 2018/0272965 A1* | 9/2018 | Chen | H04L 67/12 |
| 2018/0299289 A1* | 10/2018 | Hill | H04W 4/48 |
| 2018/0346027 A1* | 12/2018 | Fujii | B60Q 9/00 |
| 2020/0247318 A1* | 8/2020 | Yamamuro | B60Q 9/008 |

* cited by examiner

PERFORMANCE OPTIMIZATION BASED ON HMI PRIORITIES

CROSS-REFERENCE TO RELATED APPLICATIONS

This U.S. patent application claims priority under 35 U.S.C. § 119(e) to U.S. Provisional Application 62/873,076, filed Jul. 11, 2019, which is hereby incorporated by reference in its entirety.

TECHNICAL FIELD

This disclosure relates to performance optimization based on Human Machine Interface (HMI) priorities during vehicle-to-everything communications.

BACKGROUND

Vehicle-to-everything (V2X) communication is the process of transmitting information from a vehicle to any entity that may affect the vehicle, and vice versa. V2X includes several types of communication, such as, but not limited to V2I (vehicle-to-infrastructure), V2N (vehicle-to-network), V2V (vehicle-to-vehicle), V2P (vehicle-to-pedestrian), V2D (vehicle-to-device), and V2G (vehicle-to-grid). V2X allows communication between the vehicle and other entities which results in road safety, traffic efficiency, and energy savings.

V2X does not scale well in terms of processing power needed. Depending on how many V2X messages are received by a vehicle controller (V2X system), the processing power may multiply since it is typically linearly dependent on the message count. Therefore, it is desirable to have a system that is configured to filter received messages (e.g., from an infrastructure, a network, another vehicle, a pedestrian, a device, and/or a grid) to reduce the processing power needed when the system receives an overwhelming number of messages.

SUMMARY

One aspect of the disclosure provides a method for reducing processing power of a data processing hardware executing one or more applications, the method includes receiving, at the data processing hardware, communication messages. The method also includes identifying, at the data processing hardware, a first application from the one or more applications outputting a first message based on at least one communication message. The first application is associated with a first priority value. The method also includes transmitting, from the data processing hardware to a user interface, instructions causing the first message to be provided to the driver. The method includes determining, at the data processing hardware, a group of high-priority applications from the one or more applications where each application has a priority value being higher than or equal to the first priority value. The method includes discarding, at the data processing hardware, one or more communication messages that are not relied on by the group of high-priority applications.

Implementations of this aspect of disclosure may include one or more of the following optional features. In some implementations, the method further includes identifying, at the data processing hardware, a second application from the one or more applications, the second application providing a second message to the driver based on at least one communication message and having a second priority value. Additionally, the method includes sending, from the data processing hardware to a first channel of the user interface, instructions to output the first message and instructions to output the second message. When the first priority value is higher than the second priority value, the group of high-priority applications includes applications having a priority value higher than or equal to the second priority value. In some examples, the first channel is a display or an audio system and the second channel is a haptic feedback system.

In some implementations, the instructions causing the first message to be provided to the driver include: instructions to a display in communication with the data processing hardware, where the instructions cause the first message to be displayed for a predefined period of time. Discarding the one or more communication messages that are not relied on by the group of high-priority applications is executed for the predefined period of time.

In some examples, discarding the one or more communication messages that are not relied on by the group of high-priority applications includes identifying one or more relevant messages from the communication messages. The one or more relevant messages are used by one or more application of the group of high-priority applications. Discarding the one or more communication messages that are not relied on by the group of high-priority applications also includes processing only the one or more relevant messages.

The one or more applications may include at least one of: Intersection Movement Assist (IMA), Forward Collision Warning (FCW), and Do Not Pass Warning (DNPW), Left Turn Assist (LTA), Electronic Emergency Brake Light (EEBL), Signal Violation Warning (SVW), Traffic Light Assist (TLA), or Green Light Optimized Speed Advisory (GLOSA). The communication messages may include at least one of: SPaT (Signal Phase and Timing) signal, MAP (Map data) signal, or a BSMs (Basic Safety messages).

Another aspect of the disclosure provides a method for reducing processing power of a data processing hardware executing one or more applications. The method includes receiving, at the data processing hardware, communication messages. The method also includes determining, at the data processing hardware, a first application from the one or more applications outputting a first message based on at least one communication message. The first application is associated with a first priority value. The method also includes sending, from the data processing hardware to a user interface, instructions causing the first message to be provided to the driver. The method also includes determining, at the data processing hardware, a group of low-priority applications from the one or more applications where each application has a priority value being lower than the first priority value. The method also includes sending, from the data processing hardware to the group of low-priority applications, instructions causing the one or more applications of the low-priority group of applications to stop executing for a predefined period of time.

Implementations of this aspect of the disclosure may include one or more of the following optional features. In some implementations, the method includes identifying, at the data processing hardware, a second application from the one or more applications where the second application provides a second message to the driver based on at least one communication message and having a second priority value. The method also includes sending, from the data processing hardware to a first channel of the user interface, instructions to provide the first message and sending, from the data processing hardware to a second channel of the user interface, instructions to provide the second message. When the first priority value is higher than the second priority value, the group of low-priority applications includes applications having a priority value lower than the second priority value. The first channel may be a display or an audio system and the second channel is a haptic feedback system.

In some implementations, the instructions causing the first message to be provided to the driver include: instructions to a display in communication with the data processing hardware, where the instructions cause the first message to be displayed for the predefined period of time. In some examples, the one or more applications include at least one of: Intersection Movement Assist (IMA), Forward Collision Warning (FCW), and Do Not Pass Warning (DNPW), Left Turn Assist (LTA), Electronic Emergency Brake Light (EEBL), Signal Violation Warning (SVW), Traffic Light Assist (TLA), or Green Light Optimized Speed Advisory (GLOSA). The communication messages may include at least one of: SPaT (Signal Phase and Timing) signal, MAP (Map data) signal, or a BSMs (Basic Safety messages).

Yet another aspect of the disclosure provides a method for reducing processing power of a data processing hardware executing one or more applications. The method includes receiving, at the data processing hardware, communication messages. The method also includes identifying, at the data processing hardware, a first application from the one or more applications outputting a first message based on at least one communication message, the first application associated with a first priority value. The method also includes transmitting, from the data processing hardware to a user interface, instructions causing the first message to be provided to the driver. The method includes determining, at the data processing hardware, a group of high-priority applications from the one or more applications where each application has a priority value being higher than or equal to the first priority value. The method also includes determining, at the data processing hardware, a group of low-priority applications from the one or more applications where each application has a priority value being lower than the first priority value. The method also includes discarding, at the data processing hardware, one or more communication messages that are not relied on by the group of high-priority applications for a predefined period of time. Additionally or alternatively, the method includes sending, from the data processing hardware to the group of low-priority applications, instructions causing the one or more applications of the low-priority group of applications to stop executing for the predefined period of time.

Implementations of this aspect of the disclosure may include one or more of the following optional features. In some implementations, the method further includes identifying, at the data processing hardware, a second application from the one or more applications, the second application providing a second message to the driver based on at least one communication message and having a second priority value. The method also includes outputting, from the data processing hardware to a first channel of the user interface, the first message and outputting, from the data processing hardware to a second channel of the user interface, the second message. When the first priority value is higher than the second priority value, the group of high-priority applications includes applications having a priority value higher than or equal to the second priority value and the group of low-priority applications includes applications having a priority value lower than the second priority value. In some examples, the first channel is a display or an audio system and the second channel is a haptic feedback system.

In some examples, the instructions causing the first message to be provided to the driver includes instructions causing the first message to be displayed on a display for the predefined period of time. Discarding the one or more communication messages that are not relied on by the group of high-priority applications may be executed for the predefined period of time. In some examples, discarding the one or more communication messages that are not relied on by the group of high-priority applications is executed for the predefined period of time includes: identifying one or more relevant messages from the communication messages, where the one or more relevant messages are used by one or more application of the group of high-priority applications; and processing only the one or more relevant messages.

In some examples, the one or more applications include at least one of: Intersection Movement Assist (IMA), Forward Collision Warning (FCW), and Do Not Pass Warning (DNPW), Left Turn Assist (LTA), Electronic Emergency Brake Light (EEBL), Signal Violation Warning (SVW), Traffic Light Assist (TLA), or Green Light Optimized Speed Advisory (GLOSA). The communication messages may include at least one of: SPaT (Signal Phase and Timing) signal, MAP (Map data) signal, or a BSMs (Basic Safety messages).

Another aspect of the disclosure provides a system that includes data processing hardware and memory hardware in communication with the data processing hardware. The memory hardware stores instructions that when executed on the data processing hardware cause the data processing hardware to perform operations. These operations may include any one of the methods described above.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
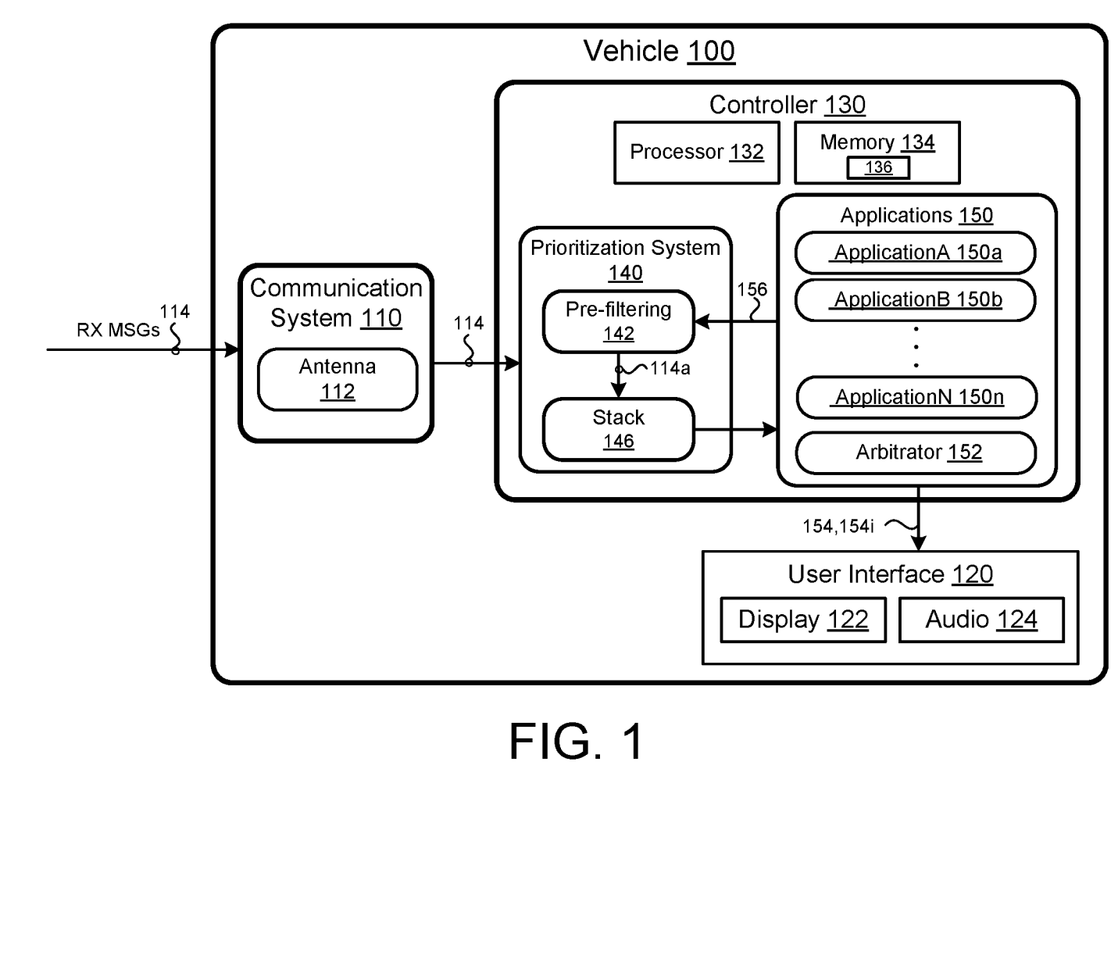
FIG. 1 is a schematic view of an exemplary overview of a vehicle having a prioritization system with a pre-filtering module.

Referring to FIG. 1, in some implementations, a vehicle 100 is equipped with a communication system 110 that allows the vehicle 100 to communicate with other entities such as other vehicles, an infrastructure, a network, a pedestrian, a device, and/or a grid. The communication system 110 may include a V2X communication system. The V2X communication system may use one or more of the following connection classes to send and/or receive messages and/or information: WLAN connection, e.g., based on IEEE 802.11, ISM (Industrial, Scientific, Medical Band) connection, Bluetooth® connection, ZigBee connection, UWB (ultrawide band) connection, WiMax® (Worldwide Interoperability for Microwave Access) connection, LTE-V2X, Cellular V2X (C-V2X), Cellular Communication (3G, 4G, 5G, . . . ), Dedicated Short Range Communications (DSRC), infrared connection, mobile radio connection, and/or radar-based communication.

In some examples, the communication system 110 includes an antenna 112 for receiving and transmitting messages/signals 114, data processing hardware, and memory hardware capable of storing instructions that cause the data processing hardware to perform one or more operations.

The vehicle 100 may include a user interface 120. In some examples, the user interface 120 includes a display 122 that provides the driver with a displayed warning message 154. The display 122 may be a touch screen display 122. The user interface 120 may include a rotary knob or a mouse to make a selection by the driver via the display 122. The user interface 120 may display one or more warning messages 154 to the driver. In some examples, the user interface 120 receives one or more user commands from the driver via one or more input mechanisms or the touch screen display 122 and/or displays one or more notifications to the driver, the driver input is for example, an acknowledgement of the received warning. In some examples, the user interface 120 includes an audio system 124 that outputs an audible warning message 154. Other examples for user interfaces 120 include haptic seats, lights, Head-Up Displays or lightbars. The user interface 120 may set a predefined time for displaying/outputting each warning message 154 to the driver. In other examples, a vehicle controller 130 (e.g., an arbitrator 152) determines the predefined time for displaying/outputting each warning message 154 to the driver.

In some implementations, the vehicle 100 includes a controller 130. The vehicle controller 130 includes a computing device (or processor) 132 (e.g., central processing unit having one or more computing processors) in communication with non-transitory memory 134 (e.g., a hard disk, flash memory, random-access memory) capable of storing instructions executable on the computing processor(s) 132. The communication system 110 may be part of the controller 130, while in other examples, the communication system 110 is separate from the controller 130. The controller 130 executes a prioritization system 140 and one or more applications 150, 150a-150n. The prioritization module 140 includes a pre-filtering module 142 and a stack 146. The prioritization system 140 may also be part of the communication system 110.

The communication system 110 receives messages 114 and sends the received messages 114 to the prioritization system 140. The pre-filtering module 142 filters the received messages 114 based on one or more criteria. Following, the stack 146 identifies one or more applications 150a-n that rely on the received one or more messages 114 to output a warning message 154 to the driver. In some examples, one or more applications 150a-n receive the messages 114 from the stack 146 each of which provides a different warning message 154 to the drive.

The one or more applications 150 may include, but are not limited to Intersection Movement Assist (IMA), Forward Collision Warning (FCW), and Do Not Pass Warning (DNPW), Left Turn Assist (LTA), Electronic Emergency Brake Light (EEBL), Signal Violation Warning (SVW), Traffic Light Assist (TLA), Green Light Optimized Speed Advisory (GLOSA). Other applications may also be included. The IMA application 150 allows the vehicle 100 to receive messages/signals 114 from other vehicles approaching an intersection from all directions. The IMA application 150 calculates a potential of a collision and provides the driver of the vehicle 100 with an IMA warning message 154 that advises the driver with progressive urgency. Therefore, the IMA allows the vehicle 100 to be aware of another vehicle even though the driver of the first vehicle does not see the second vehicle. The FCW application 150 calculates a potential of an impending rear-end collision with another vehicle ahead of the current vehicle 100 in traffic, in the same lane moving in the same direction. The FCW application 150 provides the driver with an FCW warning message 154 that advises the driver with progressive urgency. The DNPW application 150 provides the driver of the vehicle 100 with a DNPW warning message 154 during a passing maneuver attempt when a slower-moving vehicle ahead of the vehicle 100 cannot be passed safely using a passing zone, due to the passing zone being occupied by vehicles moving in the opposite direction. In some examples, the DNPW application 150 provides the warning message 154 even though the driver is not attempting to pass the vehicle 100 in front of him/her. The LTA application 150 provides the driver with an LTA warning message 154 that warns the driver during a left turn attempt when it is not safe to enter an intersection or continue in the left turn attempt, due to a vehicle approaching the same path without an intent to stop. The EEBL application 150 enables the vehicle to transmit a self-generated emergency brake event to surrounding vehicles. In addition, when receiving an EEBL message from another vehicle, the EEBL application of the current vehicle 100 determines the relevance of the event and, if appropriate, provides an EEBL warning message 154. The SVW application provides the driver with an SVW warning message 154 that informs the driver of potential upcoming signal (i.e., traffic light) violation. The TLA application 150 determines data related to a traffic signal, tailback, and the geometry on an intersection and provides the driver with a TLA warning message 154 relating the traffic signal. The GLOSA application 150 determines the optimal speed for approaching the next traffic light and informs the driver with a warning message 154 of that optimal speed.

The controller 130 may execute the one or more applications 150 simultaneously causing the warning messages 154 from the applications 150 to also be simultaneously outputted to the driver. Therefore, the controller 130 includes an application arbitrator 152 that arbitrates the warning messages 154 based on their importance to the driver and only outputs messages 154 associated with applications 150 having a high priority. Additionally, since the user interface 120 can only provide a limited number of warning messages 154 simultaneously to the driver, i.e., via the display 122 and/or the audio system 124, the arbitrator 152 determines which of the warning messages 154 to be provided to the driver based on their priority. For example, the display 122 may display one or more warning messages 154; however, the audio system 124 can only output one warning messages 154 at a time. Therefore, the application arbitrator 152 arbitrates the warning messages 154 based on the priority of their associated application 150 and instructs the user interface 120 to provide one or more warning messages 154 based on the application priority of each of the applications 150. The arbitrator 152 sends instructions to the user interface 120 to provide the one or more warning messages 154 (associated with one or more applications 150) to the driver.

In some examples, the application arbitrator 152 may include a list 136 of applications 150a-n (stored in memory 134) having a priority from a highest priority value to a lowest priority value where an application having the highest priority value is indicative of the application being the most important within the applications 150. One example of applications 150a-n having the highest priority to the lowest priority may be: LTA (highest priority), IMA, EEBL, SVW, TLA, GLOSA (lowest priority). The priority list 136 may be updated and stored in the memory 134. In some examples, the vehicle controller 130 may receive an updated application priority list 136 by way of the communication system 110 or through the user interface 120. In some examples, one or more applications 150 may have the same priority (e.g., same priority value). Therefore, the priority may be based on a grouping of applications 150. The warning message 154 associated with the highest priority application 150 is provided to the user interface 120 for a predefined period of time such that the driver does not get distracted by the changing messages 154 displayed on the display 122 or outputted via the audio system 124. In some examples, a minimum predefined period of time determined by each specific application 150a-n is considered when determining the predefined period of time.

Based on the application priority list 136, the pre-filtering module 142 may be triggered to discard all received messages 114 that do not relate to the high priority application 150 that is triggering the warning message 154 before sending these messages to the stack 146. In other words, the pre-filtering module 142 receives an indication 156 from the application 150a-n (or in some example, from the arbitrator 152) sending the warning message 154 to the driver and having the highest priority. The received indication 156 causes the pre-filtering module 142 to adjust the criteria of filtering/discarding the received messages 114 such that only messages relevant to the current application 150a-n with the highest priority is passed to the stack 146. As such, only received filtered messages 114a related to the application 150a-n having the highest priority and sending warning messages 154 to the driver are transmitted to the stack 146. The applications 150a-n that are not associated with the filtered warning message(s) 114a and are deemed low priority are temporarily prevented from being executed to save processing power. In addition, these applications 150a-n that are not associated with the filtered warning message(s) 114a may no longer receive messages 114; therefore, these applications 150a-n are prevented from sending warning messages 154 to the driver since some of the received messages 114 are being discarded.

In some implementations, as soon as a warning message 154 is provided to the driver (i.e., via the display 122 or audio system 124) then, all applications 150 with a priority value lower than the application 150 with the priority value that sent the warning message 154 will be shut off at least for the minimum messaging time and therefore these lower priority applications do not send warning messages 154. In this case, extra processing power is made available for the higher priority applications 150 or any other computations needed by the vehicle controller 130. In addition, the pre-filtering module 142 may be adjusted such that only incoming messages 114 relevant to the current application 150 or applications with a higher priority are passed through to the stack 146, then to the applications 150. The current application 150 changes based on the received message 114.

In some examples, the received messages 114 may include a SPaT (Signal Phase and Timing) signal and MAP (Map data) signal, and/or a BSMs (Basic Safety messages). A SpaT signal is associated with the operation of an intersection having a traffic signal and conveys a current status of the signal at the intersection as well as when the next signal change will occur in the current path. A MAP signal describes the physical geometry of one or more intersections. A BSM may include core vehicle data elements such as, but not limited to, vehicle size, position, speed, heading, acceleration, and brake system status.

In some examples, if the application priority list 136 is as follows: LTA (highest priority), IMA, EEBL, SVW, TLA, GLOSA (lowest priority), and an LTA warning message 154 based on a received BSM message 114 is provided to the user interface 120, then the pre-filtering module 142 discards SPaT and MAP messages 114 if LTA is only based on BSM 114a. In another example, if an EEBL warning message 154 from an EEBL application 150 based on a received BSM 114 is provided to the user interface 120, the pre-filtering module 142 may discard SPAT (Signal Phase and Timing message) and MAP (Map data) messages 114 if EEBL, IMA and LTA are just based on BSMs 114. In other words, the controller 130 determines the application 150 associated with the outputted warning message 154 and prevents all other applications 150 from receiving messages 114 and/or prevents all other applications 150 from executing thus prevents all other applications 150 from processing messages 114 and/or executing for a period of time (e.g., the duration of time the warning message 154 is provided to the user interface 120).

The above is described with the assumption of just one application 150 sending a warning message 154 to the user interface 120; however, the above also applies when more than one application 150, 150a-n can transmit warning messages 154 to the user interface 120 simultaneously, as long as there is still a prioritization and some applications 150, 150a-n are prioritized as low priority.

In some implementations, the display 122 does not have a predefined messaging time for providing each warning message 154. In this case, the vehicle controller 130 (e.g., the arbitrator 152) sets a minimum time to provide each warning message 154 for each application 150 or for all applications 150. This is beneficial if because it reduces the data being transmitted over the vehicle BUS.

Figure 2:
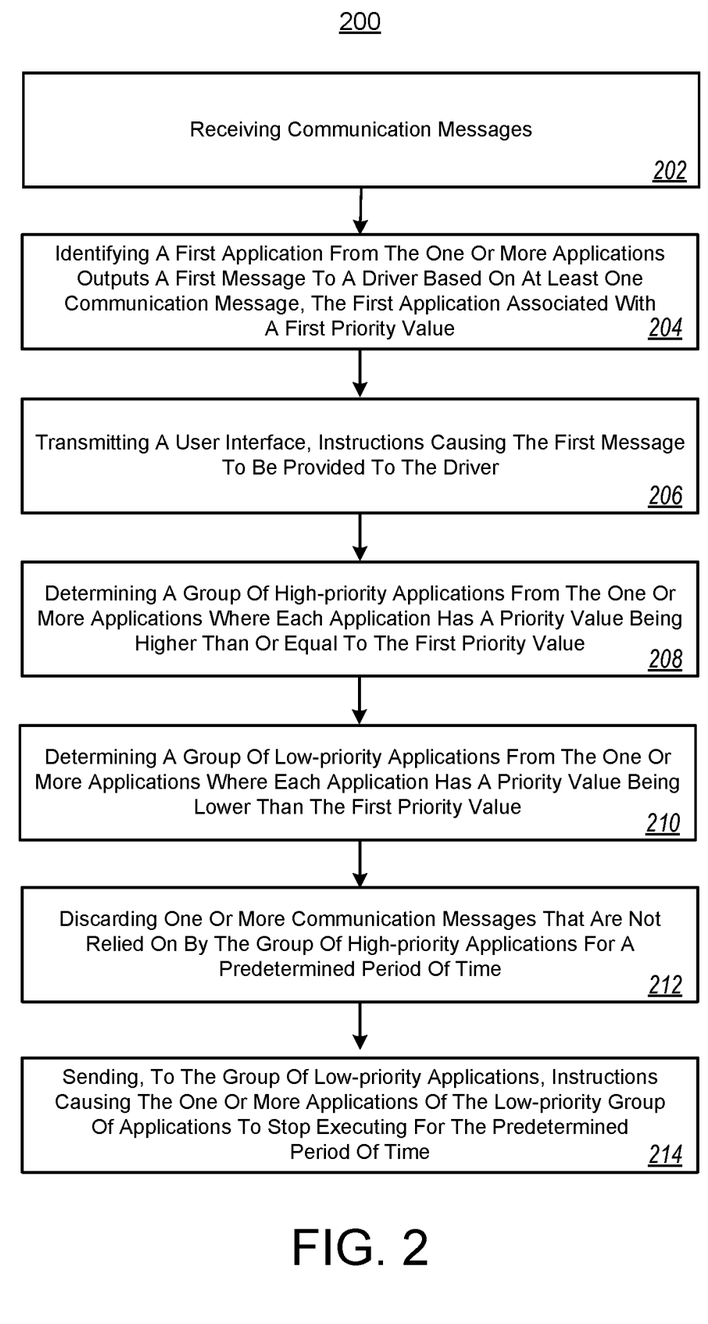
FIG. 2 is a schematic view of an exemplary arrangement of operations for a method of reducing processing power of a data processing hardware executing one or more applications and supported by a vehicle.

FIG. 2 provides an example arrangement of operations for a method 200 of reducing processing power of a data processing hardware 132 (i.e., controller 130) executing one or more applications 150, 150a-n using the system of FIG. 1. In some examples, the controller 130 is supported by a vehicle 100. At block 202, the method 200 includes receiving communication messages 114 at an antenna 112 of a communication system 110. In some examples, the communication messages 114 include at least one of: SPaT (Signal Phase and Timing) signal, MAP (Map data) signal, or a BSMs (Basic Safety messages). At block 204, the method 200 includes identifying a first application 150a-n from the one or more applications. The first identified application 150a-n outputting a first message 154 to a driver based on at least one communication message 114. The first application 150a-n is associated with a first priority value P1. At block 206, the method 200 includes transmitting to a user interface 120, instructions 154i causing the first message 154 to be provided to the driver. For examples, the instructions 154i causing the first message 154 to be provided to the driver may include instruction causing the first message 154 to be displayed on a display of the user interface 120 for the predefined period of time. At block 208, the method 200 includes determining a group of high-priority applications 150a-n from the one or more applications 150a-n where each application 150a-n has a priority value being higher than or equal to the first priority value P1. At block 210, the method 200 includes determining a group of low-priority applications from the one or more applications 150a-n where each application 150a-n has a priority value Pa being lower than the first priority value P1 (i.e., P1>Pa). In other words, the first application 150a-n is more important than any other application within the group of low-priority applications.

In some examples, at block 212, the method 200 includes discarding one or more communication messages 114 that are not relied on by the group of high-priority applications for a predefined period of time to save processing power. Discarding the one or more communication messages that are not relied on by the group of high-priority applications may be executed for the predefined period of time.

Additionally or alternatively, in some examples, at block 214, the method 200 may include sending to the group of low-priority applications, instructions causing the one or more applications 150a-n of the low-priority group of applications to stop executing for the predefined period of time.

In some implementations, the method 200 also includes identifying a second application 150a-n from the one or more applications 150a-n. The second application providing a second message 154 to the driver based on the at least one communication message 114. The second message 154 has a second priority value. The method 200 also includes outputting to a first channel of the user interface 120, the first message 154 associated with the first application 150a-n and outputting to a second channel of the user interface 120, the second message. In some examples, the first channel is the display 122 or the audio system 124, while the second channel is a haptic feedback system via the steering wheel or the driver seat for example. In some examples, when the first priority value P1 is higher than the second priority value P2 (i.e., P1>P2), then the group of high-priority applications includes applications having a priority value higher than or equal to the second priority value. In addition, the group of low-priority applications includes applications having a priority value lower than the second priority value.

In some examples, if the first application 150a-n and the second application 150a-n are both configured to output the message 154 to the same output channel (i.e., both are configured to output to the display 122), and the first priority value P1 of the first application 150a-n is higher than the second priority value P2 (P1>P2), then the group of high-priority applications includes applications having a priority value higher than or equal to the first priority value which does not include the second application 150a-n. However, if the first priority value P1 of the first application 150a-n is lower than the second priority value P2 (P1<P2), then the group of high-priority applications includes applications having a priority value higher than or equal to the second priority value which does not include the first the first application 150a-n.

In some implementations, discarding the one or more communication messages 114 that are not relied on by the group of high-priority applications for the predefined period of time includes identifying one or more relevant messages 114 from the communication messages 114, where the one or more relevant messages 114 are used by one or more application 150a-n of the group of high-priority applications; and processing only the one or more relevant messages 114.

In some examples, the one or more applications include at least one of: Intersection Movement Assist (IMA), Forward Collision Warning (FCW), and Do Not Pass Warning (DNPW), Left Turn Assist (LTA), Electronic Emergency Brake Light (EEBL), Signal Violation Warning (SVW), Traffic Light Assist (TLA), or Green Light Optimized Speed Advisory (GLOSA). The communication messages 114 may include at least one of: SPaT (Signal Phase and Timing) signal, MAP (Map data) signal, or a BSMs (Basic Safety messages). The communication messages may include at least one of: SPaT (Signal Phase and Timing) signal, MAP (Map data) signal, or a BSMs (Basic Safety messages).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, model-based design with auto-code generation and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for reducing processing power of a data processing hardware executing one or more applications, the method comprising:
    receiving, at the data processing hardware, communication messages wherein the communication messages include at least one of Signal Phase and Timing (SPaT) signal, Map Data (MAP) signal, or Basic Safety Messages (BSMs);
    identifying, at the data processing hardware, a first application from the one or more applications outputting a first warning message based on at least one communication message, the first application associated with a first priority value, wherein the one or more applications include at least one of Intersection Movement Assist (IMA), Left Turn Assist (LTA), Electronic Emergency Brake Light (EEBL), Signal Violation Warning (SVW), Traffic Light Assist (TLA), or Green Light Optimized Speed Advisory (GLOSA) wherein the one or more applications have a priority order from highest to lowest, and wherein the priority order from highest to lowest is LTA, IMA, EEBL, SVW, TLA, GLOSA;
    transmitting, from the data processing hardware to a user interface, instructions causing the first warning message to be provided to a driver;
    determining, at the data processing hardware, a group of high-priority applications from the one or more applications where each application has a priority value being higher than or equal to the first priority value; and
    discarding, at the data processing hardware, one or more communication messages that are not relied on by the group of high-priority applications.

2. The method of claim 1, further comprising:
    identifying, at the data processing hardware, a second application from the one or more applications, the second application providing a second warning message to the driver based on at least one communication message and having a second priority value;
    sending, from the data processing hardware to a first channel of the user interface, instructions to output the first warning message; and
    sending, from the data processing hardware to a second channel of the user interface, instructions to output the second warning message;
    wherein when the first priority value is higher than the second priority value, the group of high-priority applications includes applications having a priority value higher than or equal to the second priority value.

3. The method of claim 2, wherein the first channel is a display or an audio system and the second channel is a haptic feedback system.

4. The method of claim 1, wherein the instructions causing the first warning message to be provided to the driver include: instructions to a display in communication with the data processing hardware, the instructions causing the first warning message to be displayed for a predefined period of time.

5. The method of claim 4, wherein discarding the one or more communication messages that are not relied on by the group of high-priority applications is executed for the predefined period of time.

6. The method of claim 1, wherein discarding the one or more communication messages that are not relied on by the group of high-priority applications comprises:
    identifying one or more relevant messages from the communication messages, the one or more relevant messages used by one or more application of the group of high-priority applications; and
    processing only the one or more relevant messages.

7. A method for reducing processing power of a data processing hardware executing one or more applications, the method comprising:
    receiving, at the data processing hardware, communication messages wherein the communication messages include at least one of Signal Phase and Timing (SPaT) signal, Map Data (MAP) signal, or Basic Safety Messages (BSMs);
    determining, at the data processing hardware, a first application from the one or more applications outputting a first warning message based on at least one communication message, the first application associated with a first priority value, wherein the one or more applications include at least one of Intersection Movement Assist (IMA), Left Turn Assist (LTA), Electronic Emergency Brake Light (EEBL), Signal Violation Warning (SVW), Traffic Light Assist (TLA), or Green Light Optimized Speed Advisory (GLOSA) wherein the one or more applications have a priority order from highest to lowest, and wherein the priority order from highest to lowest is LTA, IMA, EEBL, SVW, TLA, GLOSA;
    sending, from the data processing hardware to a user interface, instructions causing the first warning message to be provided to a driver;
    determining, at the data processing hardware, a group of low-priority applications from the one or more applications where each application has a priority value being lower than the first priority value; and
    sending, from the data processing hardware to the group of low-priority applications, instructions causing the one or more applications of the low-priority group of applications to stop executing for a predefined period of time.

8. The method of claim 7, further comprising:
    identifying, at the data processing hardware, a second application from the one or more applications, the second application providing a second warning message to the driver based on at least one communication message and having a second priority value;
    sending, from the data processing hardware to a first channel of the user interface, instructions to provide the first warning message; and
    sending, from the data processing hardware to a second channel of the user interface, instructions to provide the second warning message;
    wherein when the first priority value is higher than the second priority value, the group of low-priority applications includes applications having a priority value lower than the second priority value.

9. The method of claim 8, wherein the first channel is a display or an audio system and the second channel is a haptic feedback system.

10. The method of claim 7, wherein the instructions causing the first warning message to be provided to the driver include: instructions to a display in communication with the data processing hardware, the instructions causing the first warning message to be displayed for the predefined period of time.

11. A method for reducing processing power of a data processing hardware executing one or more applications, the method comprising:
receiving, at the data processing hardware, communication messages wherein the communication messages include at least one of Signal Phase Timing (SPaT) signal, Map Data (MAP) signal, or Basic Safety Messages (BSMs);
identifying, at the data processing hardware, a first application from the one or more applications outputting a first warning message based on at least one communication message, the first application associated with a first priority value, wherein the one or more applications include at least one Intersection Movement Assist (IMA), Left Turn Assist (LTA), Electronic Emergency Brake Light (EEBL), Signal Violation Warning (SVW), Traffic Light Assist (TLA), or Green Light Optimized Speed Advisory (GLOSA) wherein the one or more applications have a priority order from highest to lowest, and wherein the priority order from highest to lowest is LTA, IMA, EEBL, SVW, TLA, GLOSA;
transmitting, from the data processing hardware to a user interface, instructions causing the first warning message to be provided to a driver;
determining, at the data processing hardware, a group of high-priority applications from the one or more applications where each application has a priority value being higher than or equal to the first priority value;
determining, at the data processing hardware, a group of low-priority applications from the one or more applications where each application has a priority value being lower than the first priority value;
discarding, at the data processing hardware, one or more communication messages that are not relied on by the group of high-priority applications for a predefined period of time; and
sending, from the data processing hardware to the group of low-priority applications, instructions causing the one or more applications of the low-priority group of applications to stop executing for the predefined period of time.

12. The method of claim 11, further comprising:
identifying, at the data processing hardware, a second application from the one or more applications, the second application providing a second warning message to the driver based on at least one communication message and having a second priority value;
outputting, from the data processing hardware to a first channel of the user interface, the first warning message;
outputting, from the data processing hardware to a second channel of the user interface, the second warning message;
wherein when the first priority value is higher than the second priority value, the group of high-priority applications includes applications having a priority value higher than or equal to the second priority value and the group of low-priority applications includes applications having a priority value lower than the second priority value.

13. The method of claim 12, wherein the first channel is a display or an audio system and the second channel is a haptic feedback system.

14. The method of claim 11, wherein the instructions causing the first warning message to be provided to the driver includes instruction causing the first warning message to be displayed on a display for the predefined period of time.

15. The method of claim 11, wherein discarding the one or more communication messages that are not relied on by the group of high-priority applications for the predefined period of time comprises:
identifying one or more relevant messages from the communication messages, the one or more relevant messages used by one or more application of the group of high-priority applications; and
processing only the one or more relevant messages.

* * * * *